United States Patent
Pylappan

(10) Patent No.: US 11,140,517 B2
(45) Date of Patent: Oct. 5, 2021

(54) PEER TO PEER LOCATION UPDATES

(71) Applicant: Curbside Inc., Palo Alto, CA (US)

(72) Inventor: Seejo Pylappan, Cupertino, CA (US)

(73) Assignee: CURBSIDE INC., Palo Alto, CA (US)

( * ) Notice: Subject to any disclaimer, the term of this patent is extended or adjusted under 35 U.S.C. 154(b) by 0 days.

(21) Appl. No.: 16/162,902

(22) Filed: Oct. 17, 2018

(65) Prior Publication Data
US 2019/0342715 A1    Nov. 7, 2019

Related U.S. Application Data

(60) Provisional application No. 62/666,416, filed on May 3, 2018, provisional application No. 62/666,451, filed on May 3, 2018.

(51) Int. Cl.
*H04W 60/02* (2009.01)
*H04Q 1/20* (2006.01)
(Continued)

(52) U.S. Cl.
CPC ............. *H04W 4/029* (2018.02); *G01S 19/48* (2013.01); *G01S 19/49* (2013.01);
(Continued)

(58) Field of Classification Search
CPC ..... H04L 67/18; H04L 67/20; H04L 67/2823; H04L 47/12; H04L 67/104;
(Continued)

(56) References Cited

U.S. PATENT DOCUMENTS

2006/0155465 A1* 7/2006 Jung ...................... G01C 21/20
701/533
2006/0270421 A1* 11/2006 Phillips .............. G08B 21/0236
455/457
(Continued)

FOREIGN PATENT DOCUMENTS

CA          2813926 A1     5/2012

OTHER PUBLICATIONS

International Search Report and Written Opinion dated Jul. 29, 2019 for corresponding PCT Application No. PCT/US2019/030550.
(Continued)

*Primary Examiner* — Edan Orgad
*Assistant Examiner* — Vanneilian Lalchinthang
(74) *Attorney, Agent, or Firm* — Polsinelli PC

(57) ABSTRACT

Systems, methods and computer-readable media are obtaining location updates of a tracking device via peer to peer communication with other nearby devices where obtaining such update is otherwise not possible. In one aspect, a method includes receiving, at a device, a first location update from a network component; determining, by the device, if a triggering condition is met for determining a second location update; activating, by the device, device-to-device communication for receiving the second location update from nearby devices in vicinity of the device when the triggering condition is met receiving the second location update from at least one of the nearby devices via the device-to-device communication; and sending the second location update to a server for the server to determine an arrival alert for alerting a destination of an amount of time remaining until the device reaches the destination.

18 Claims, 8 Drawing Sheets

(51) Int. Cl.
| | |
|---|---|
| H04L 12/801 | (2013.01) |
| H04W 4/029 | (2018.01) |
| H04W 4/02 | (2018.01) |
| G06Q 10/06 | (2012.01) |
| G01S 19/49 | (2010.01) |
| G01S 19/48 | (2010.01) |
| G08B 21/22 | (2006.01) |
| H04W 4/021 | (2018.01) |
| H04L 29/08 | (2006.01) |
| H04W 4/23 | (2018.01) |
| H04W 4/38 | (2018.01) |
| H04W 4/70 | (2018.01) |
| H04W 4/80 | (2018.01) |
| H04W 4/12 | (2009.01) |
| H04W 64/00 | (2009.01) |
| H04W 88/04 | (2009.01) |
| G06Q 30/06 | (2012.01) |
| G08G 1/00 | (2006.01) |
| G06N 20/00 | (2019.01) |
| G01S 19/13 | (2010.01) |

(52) U.S. Cl.
CPC .. *G06Q 10/063114* (2013.01); *G06Q 30/0633* (2013.01); *G08B 21/22* (2013.01); *G08G 1/205* (2013.01); *H04L 67/18* (2013.01); *H04L 67/20* (2013.01); *H04L 67/2823* (2013.01); *H04W 4/021* (2013.01); *H04W 4/023* (2013.01); *H04W 4/025* (2013.01); *H04W 4/12* (2013.01); *H04W 4/23* (2018.02); *H04W 4/38* (2018.02); *H04W 4/70* (2018.02); *H04W 4/80* (2018.02); *H04W 64/003* (2013.01); *H04W 88/04* (2013.01); *G01S 19/13* (2013.01); *G06N 20/00* (2019.01)

(58) Field of Classification Search
CPC ....... G06Q 10/063114; G06Q 30/0633; G06Q 10/06311; G01S 19/48; G01S 19/49; G01S 19/13; G08B 21/22; G08B 25/08; G08G 1/205; G08G 1/207; H04W 4/021; H04W 4/023; H04W 4/025; H04W 88/005; G06N 20/00
USPC .......................................... 370/329
See application file for complete search history.

(56) References Cited

U.S. PATENT DOCUMENTS

| | | | |
|---|---|---|---|
| 2010/0131502 A1* | 5/2010 | Fordham | G06F 16/24573 707/736 |
| 2010/0325194 A1* | 12/2010 | Williamson | H04L 67/18 709/203 |
| 2011/0145426 A1* | 6/2011 | Miyajima | H04L 63/0272 709/230 |
| 2012/0069786 A1* | 3/2012 | Wiatrowski | H04W 74/02 370/315 |
| 2012/0135753 A1* | 5/2012 | Wang | H04W 52/0206 455/456.1 |
| 2013/0207840 A1* | 8/2013 | Mook | G01S 19/11 342/357.63 |
| 2014/0140296 A1* | 5/2014 | Choi | H04J 11/0036 370/329 |
| 2015/0148036 A1* | 5/2015 | Grayson | H04W 60/02 455/435.1 |
| 2016/0021007 A1* | 1/2016 | Shuman | H04W 28/08 370/235 |
| 2017/0134182 A1* | 5/2017 | Davis | H04W 4/70 |
| 2018/0184348 A1* | 6/2018 | Uemura | H04W 36/08 |
| 2019/0066042 A1 | 2/2019 | Conlon | |

OTHER PUBLICATIONS

Non-Final Office Action dated Dec. 24, 2020 for co-pending U.S. Appl. No. 16/774,388.

* cited by examiner

PEER TO PEER LOCATION UPDATES

This Application claims priority to U.S. Provisional Application 62/666,416 filed on May 3, 2018 and U.S. Provisional Application 62/666,451 filed on May 3, 2018, the entire content of both of which are incorporated herein by reference.

TECHNICAL FIELD

The present technology pertains to systems and methods for arrival alerts, and more specifically pertains to using peer to peer communication for obtaining location updates to be transmitted to a server for accurate generation and transmission of arrival alerts.

BACKGROUND

Current services that provide arrival alerts often rely on receiving continuous location updates from a moving target (e.g., a vehicle) in order to determine, as accurately as possible, the timing for alerting the destination (e.g., a store) about the arrival of the moving target at the destination. For example, when a user is driving to a location of a store to pick up an ordered item, the system's objective is to provide an accurate advance alert (arrival alert) to the operator of the store so that the operator can ensure the user's order is ready for pick when the user arrives.

The determination of this timing alert, and improved accuracy thereof, further depends on signal availability for a moving target to determine its location and the ability to send this location update to a server of the system to be used for determining and sending arrival alerts. This signal availability is adversely impacted based on signal coverage conditions on a route taken by the moving target. For example, when the moving target is using an underground transit system to arrive at the store, the signal coverage for the moving target while it is underground is low or non-existent. The same would be applicable to scenarios in which a moving target may be driving through underground tunnels for an extended period of time.

SUMMARY

Example embodiments are provided for a peer to peer communication between a moving target that does not have sufficient signal coverage for determining its location in low signal coverage areas and devices that have entered the same low signal coverage area more recently and have relatively accurate location information. The moving target, through the peer to peer communication, can determine a location update to be communicate to a server for arrival alert generation.

In one aspect, a method includes receiving, at a device, a first location update from a network component; determining, by the device, if a triggering condition is met for determining a second location update; activating, by the device, device-to-device communication for receiving the second location update from nearby devices in vicinity of the device when the triggering condition is met receiving the second location update from at least one of the nearby devices via the device-to-device communication; and sending the second location update to a server for the server to determine an arrival alert for alerting a destination of an amount of time remaining until the device reaches the destination.

In one aspect, a server includes memory having computer-readable instructions stored therein; and one or more processors. The one or more processors are configured to execute the computer-readable instructions to receive a first location update from a network component; determine if a triggering condition is met before a second location update is received; activate device-to-device communication for receiving location updates from nearby devices in vicinity of the device when the triggering condition is met; receive the second location update from at least one of the nearby devices via the device-to-device communication; and transmit the second location update to a server.

In one aspect, one or more non-transitory computer-readable medium have computer-readable instructions stored thereon, which when executed by one or more processors, cause the one or more processors to receive a first location update from a network component; determine if a triggering condition is met for determining a second location update; activate on-board device-to-device communication components for receiving the second location update from nearby devices in vicinity of the tracking device when the triggering condition is met; receive the second location update from at least one of the nearby devices via the device-to-device communication components; and send the second location update to a server for the server to determine an arrival alert for alerting a destination of an amount of time remaining until the tracking device reaches the destination.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art to improve a moving target's (e.g., a mobile device's) ability to determine its location in order to provide more accurate location updates to a service provider that provides arrival alerts to various destination locations informing each corresponding operator at such destinations of an arrival time of a user associated with the moving target at the corresponding destination. In particular, when a moving target is inside an enclosure where the moving target is unable to obtain location updates by communicating with nearby cell towers, access points, etc., the moving target's ability to determine its location is improved by obtaining such location updates from nearby mobile devices that have recently entered the enclosure and have updated location information, which when obtained by the moving target, allows the moving target to update its location.

The disclosure begins with a description of several example systems in which the concepts described herein can be implemented.

Figure 1:
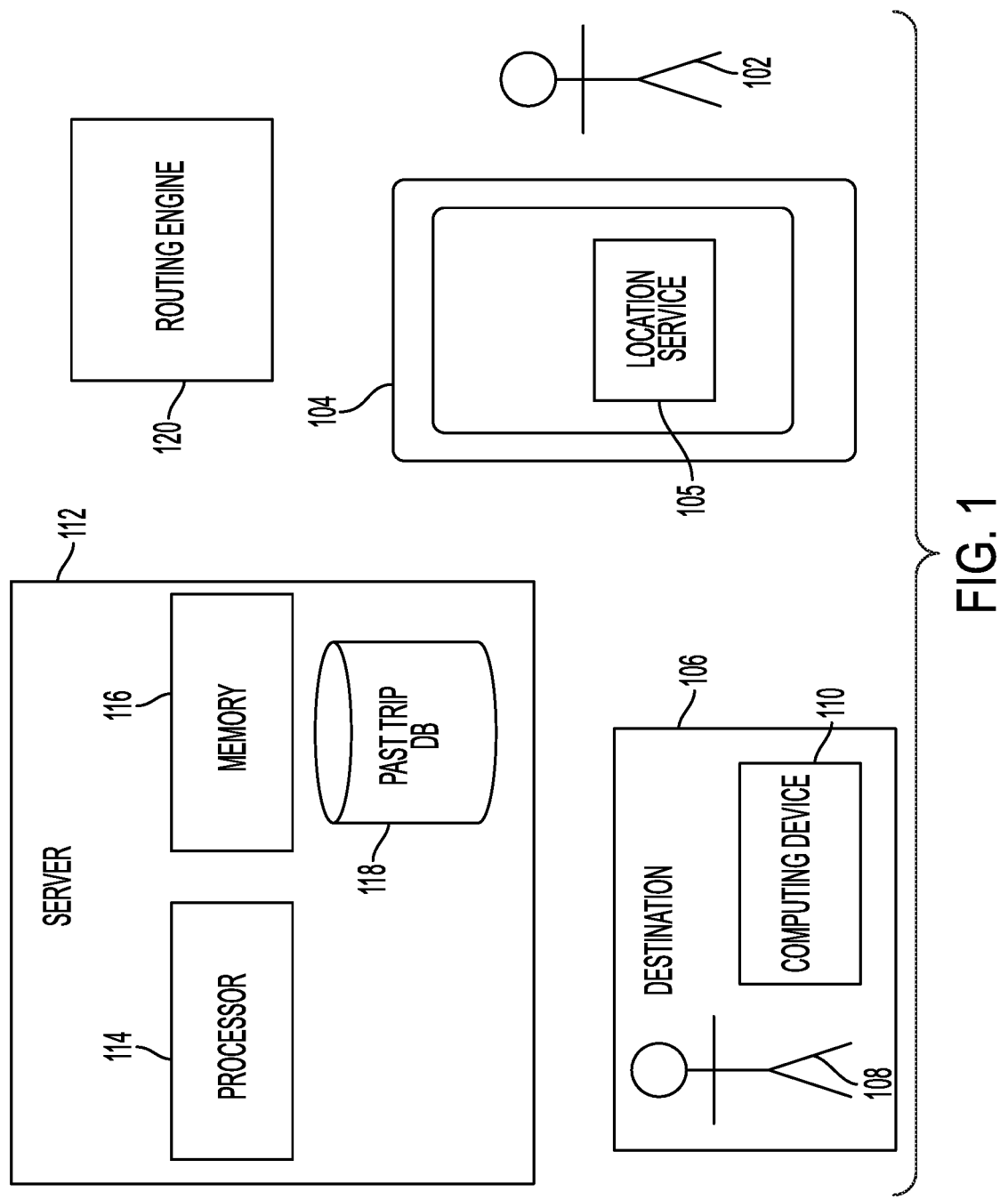
FIG. 1 shows an example system in accordance with an aspect of the present disclosure.

FIG. 1 illustrates an example system in accordance with one aspect of the present disclosure. As illustrated in FIG. 1, system 100 includes a user 102 associated with a tracking device 104 (user device 104 or customer device 104). The tracking device 104 can be any known or to be developed electronic device capable of tracking a movement of the user 102 (and the associated moving object) and communicating the same to a server 112 over a wired and/or wireless communication platform such as over a cellular network or a WiFi connection. Examples of tracking device 104 include, but are not limited to, a cellular phone, a personal digital assistant (PDA), a laptop, a tablet, a wristband tracking object, etc. In one example, tracking device 104 has location service 105. Location service 105 can be any known or to be developed built-in sensor, device and/or location determining component such as a global positioning system (GPS) device capable of recording geographical coordinates (e.g., latitude and longitude) of tracking device 104 at any given point in time.

While not shown in FIG. 1, tracking device 104, server 112 and any other component of system 100 have other components for enabling communication with other components such as transceivers.

The system 100 further includes a destination 106. Destination 106 can be a target location that is to receive arrival alerts from server 112 informing an operator thereof of the timing of user 102's arrival at destination 106. For example, destination 106 can be a brick-and-mortar store, from which user 102 has ordered item(s) for purchase and is en route to pick up the order. Other examples of destination 106 include, but are not limited to, a restaurant, a department store, other types of service providers such as dry cleaning services, a library, etc. Therefore, it is important for server 112 to provide an arrival alert to destination 106 at a threshold time ahead of the arrival of user 102 (e.g., 8 minutes prior to user's arrival at destination 106) to ensure that the ordered item(s) are ready when user 102 arrives at destination 106. Therefore, the arrival alert needs to be as accurate as possible to avoid or reduce inconveniences (e.g., waiting for the ordered item(s) to be prepared for a period of time after arrival) experienced by user 102 and/or an operator at destination 106.

Destination 106 can have an operator 108 associated therewith such as an employee. Furthermore, destination 106 can have a computing device 110 with which operator 108 interacts to receive arrival alerts, send and receive identifying information to server 112 and/or track device 104, confirm/cancel/adjust orders, etc. Computing device 110 can be any known or to be developed device that is used by destination 106 and is capable of communicating with server 112 over a wired and/or wireless connection such as a WiFi connection. Examples of computing device 110 include, but are not limited to, a tablet, a stationary computer device, a mobile device, any other known or to be developed Point of Sale (POS) devices, etc.

System 100 also includes server 112. Server 112 can have one or more processors such as processor 114 capable of implementing one or more sets of computer-readable instructions stored in one or more memories such as memory 116. Execution of any one or more of these sets of instructions enable server 112 to implement functionalities of methods described below with reference to FIGS. 3-5. These functionalities include, but are not limited to, building destination specific models using machine learning, which can then be used to provide arrival prediction services, determining smart signaling for location receiving location updates, etc.

As shown in FIG. 1, server 112 can also have database 118 (can also be referred to as past trips database 118). Data stored in database 118, as will be described below, will be used by machine learning algorithms implemented by server 112 to build destination specific models and perform arrival prediction services.

System 100 can also include routing engine 120. Routing engine 120 can be any conventional routing engine such as those commonly associated with mapping applications. Such routing engines may take into account a distance to a destination and speed limits and in some cases current traffic, weather and time of day conditions in providing preliminary arrival times to server 112, which will be used by server 112 and logics implemented thereon to refine, revise and provide arrival alerts to destination 106. Furthermore, routing engine 120 may or may not account for other location specific factors such as most likely routes to the destination, likely stops along the way and any other learned factors for generating destination specific models for destinations at server 112.

Server 112 and routine engine 120 can be co-located physically or be configured to communicate over wired and/or wireless networks. Furthermore, each identified component of system 100 can communicate with other components of system 100 and/or any other external component using currently known or to be developed cellular and/or wireless communication technologies and platforms.

Figure 2:
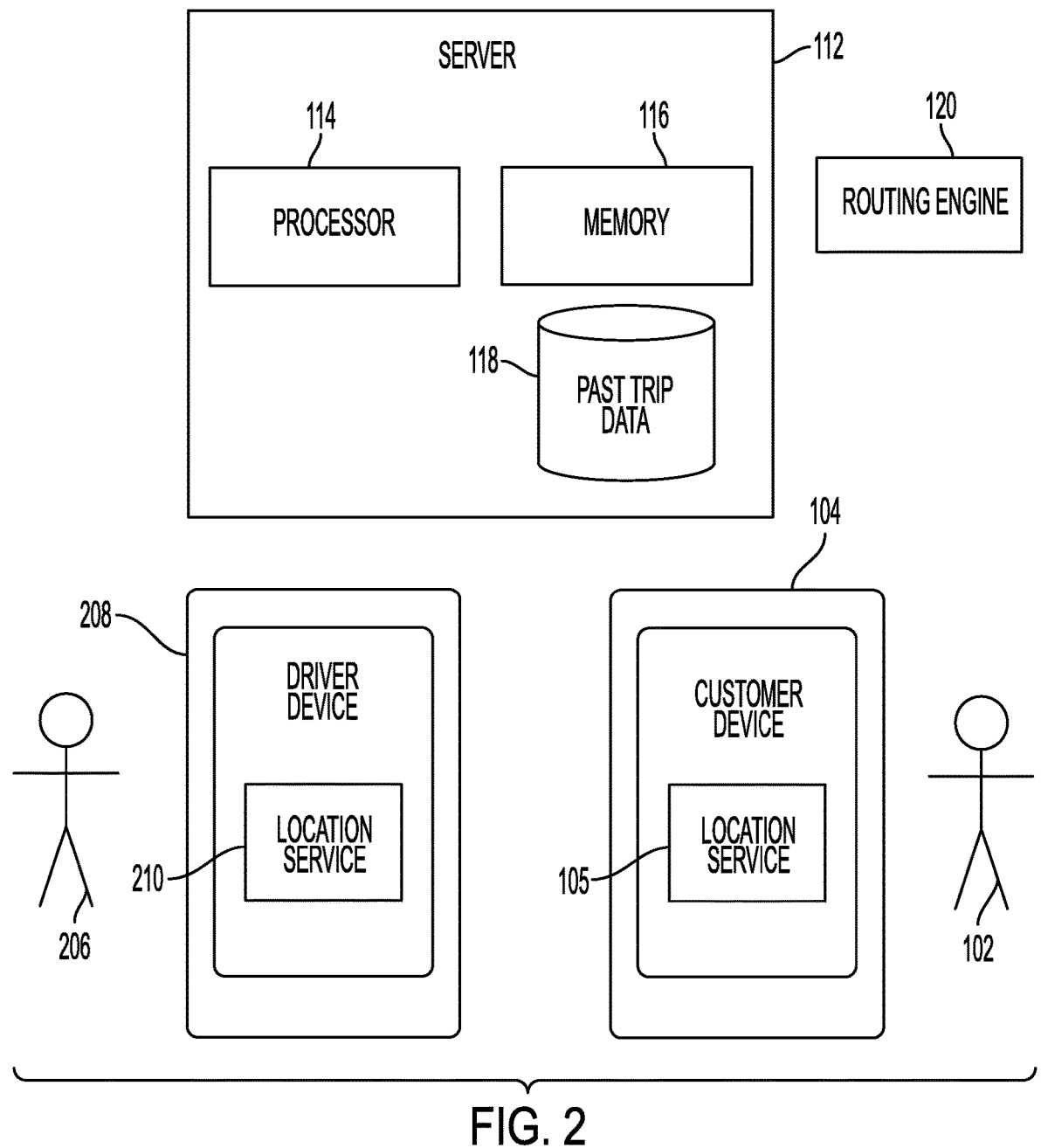
FIG. 2 shows an example system in accordance with an aspect of the present disclosure.

FIG. 2 illustrates an example system in accordance with one aspect of the present disclosure. System 200 of FIG. 2 is the same as system 100 of FIG. 1 except that instead of having user 102 travel to destination 106 to pick up item(s)/service(s) ordered as shown in FIG. 1, a destination such as destination 106 utilizes a delivery service (e.g. that of a driver) to deliver user 102's order(s) to user 102. Therefore, components of system 200 that have the same numerical reference as those in FIG. 1 will not be further described for sake of brevity.

In system 200 shown in FIG. 2, instead of destination 106 and its corresponding components, a driver 206 having an associated tracking device 208 is illustrated. In the context of FIG. 2, driver 206 and associated tracking device 208 is moving toward user 102 (similar to user 102 and tracking device 104 in FIG. 1) while user 102 is stationary (similar to destination 106 in FIG. 1). Accordingly, in the context of FIG. 2, an arrival alert is provided to user 102 informing user 102 of arrival of driver 206. Therefore, various types of calculations for location determination as described in this application are performed for determining location of tracking device 208 and estimating its arrival at user 102.

Driver 206 and tracking device 208 can be associated with a moving object such as a vehicle operated by driver 206. Tracking device 208 can be any known or to be developed electronic device capable of tracking a movement of the driver 206 (and the associated moving object) and communicate the same with server 112 over a wired and/or wireless communication platform such as over a cellular network or a WiFi connection. Examples of tracking device 208 include, but are not limited to, a cellular phone, a personal digital assistant (PDA), a laptop, a tablet, a wristband tracking object, etc. Location service 210 of tracking device 208 can be the same as location service 105 of tracking device 104 (identified as customer device 104 in FIG. 2) described above with reference to FIG. 1.

While in FIGS. 1 and 2 various components are illustrated and described, inventive concepts are not limited thereto. For example, the number of users, devices, destinations, servers, etc., are not limited to those described and can be more or less. Furthermore, both systems 100 and 200 can have additional components, architecture and/or functionalities associated therewith that are ordinary and/or necessary for proper operations thereof and thus are within the scope of the present disclosure.

As briefly mentioned above, server 112 is tasked with tracking a moving object associated with user 102 in order to provide an alert to destination 106 at a threshold time ahead of user 102's arrival at destination 106, so that operator 108 at destination 106 can prepare and ready order(s) for user 102 to pick up when he or she arrives at destination 106. Such threshold time can be a configurable parameter determined based on various factors such as operator 108 feedback, user 102 feedback, automatic system determination based on prior trips to destination 106, etc. For example, operator 108 can request that server 112 provide operator 108 with an alert when user 102 is 8 minutes away from arriving at destination 106 for picking up his or her order(s). Therefore, server 112 needs to have precise information on user's location in order to provide, as accurately as possible, an arrival alert to operator 108 at destination 106 when user 102 is 8 minutes away from reaching destination 106.

As noted above, receiving precise information on user 102's location can be challenging if signal coverage on a current route on which user 102 is traveling is weak because it would be difficult, if not impossible, for tracking device 104 of user 102 to (1) determine its location accurately and/or (2) transmit such location update to server 112 for server 112 to determine an arrival alert.

An example of a route with weak signal coverage is an underground transportation system, which will be described below with reference to FIG. 3. However, the present disclosure is not limited thereto. Another example of such route can be an underground tunnel through which cars may travel with multiple entry points or any other route for any other type of known or to be developed transportation mechanism with multiple entry points and weak signal coverage between two or more consecutive entry points.

Figure 3:
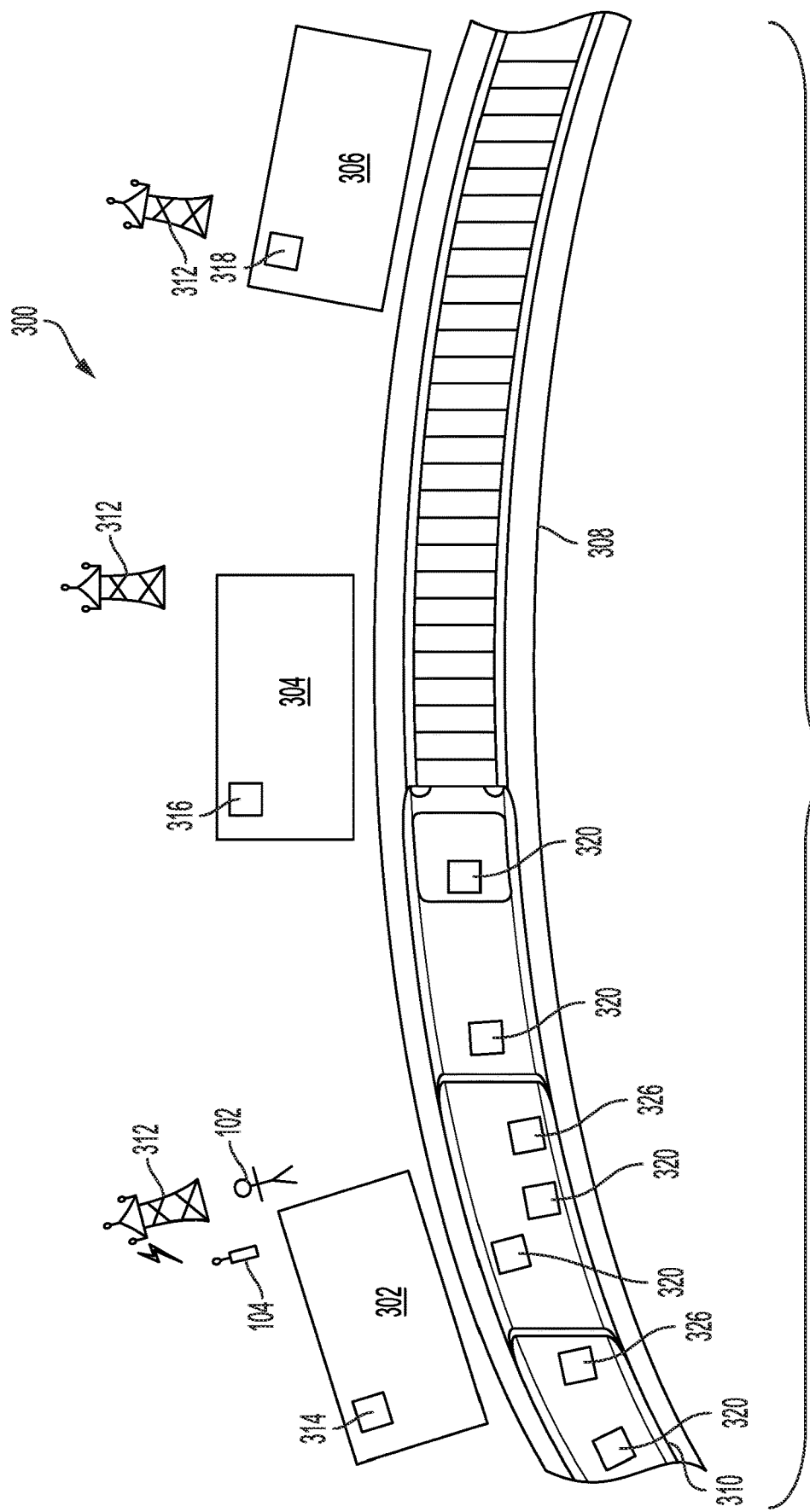
FIG. 3 is an example of a route with weak signal coverage in accordance with one aspect of the present disclosure.

FIG. 3 is an example of a route with weak signal coverage in accordance with one aspect of the present disclosure.

Setting 300 in FIG. 3 illustrates an underground transit system with three example stations, through which passengers may enter/exit the transit system. Three stations 302, 304 and 306 are connected via tunnel 308 through which, multi (or single) car train 310 may travel, carrying passengers from one station to another. While FIG. 3 illustrations an underground transportation system with only three example stations, the present disclosure is not limited thereto and such system can include any number of stations through which passengers may enter or exit the underground transportation system.

Passengers such as user 102 may enter any one of stations 302, 304 and 306 and use the underground transit system to get from point A to point B. Here and for example purposes, it is assumed that user 102 enters the underground transportation system via station 302 and will eventually exit the underground transportation system via station 306 to arrive at destination 106. It is also assumed that while using the underground transportation system, tracking device 104 is unable to communicate with nearby cell towers and/or access points to obtain updates on its location/geographical locations. Any connection between tracking device 104 and any access point onboard train 310 may not provide location updates for tracking device 104 because such access points travel with train 310 and thus reported coordinates thereof at two different locations are not used at a backend (e.g., a server associated with service provider of tracking device 104) to determine location updates.

In other words, the underground transportation system is a closed area in which receiving location by tracking device 104 and from nearby cell towers or stationary access points is not possible.

Immediately prior to entering the underground transportation system via station 302, tracking device 104 associated with user 102 may obtain a location update by communicating with a nearby cell tower that provides cellular coverage for area around station 302, such as a corresponding one of cell towers 312, or any other type of stationary access point (e.g., WiFi access points), Global Positioning System (GPS), etc., with which tracking device 104 can communicate.

Cell towers 312 associated with stations 302, 304 and 306 may or may not be the same. Furthermore, there may be multiple cell towers providing cellular coverage for one or more of stations 302, 304 and 306.

Once inside station 302, user 102 with tracking device 104 may board train 310. In one example, each of stations 302, 304 and 306 may have a stationary access point associated therewith, to which tracking device 104 may connect and obtain location updates prior to boarding train 310. These access points are access points 314, 316 and 318 shown in FIG. 3. Furthermore, each of stations 302, 304 and 306 may have more than one stationary access point associated therewith.

Upon boarding train 310 and due to weak signal coverage or absence of any signal coverage while traveling onboard train 310, tracking device 104 is unable to obtain any further updates on its location from any cell tower or stationary access point. Furthermore, when train 310 stops at a next station 304 for a short period of time for some passengers to exit or board train 310, there may not be sufficient amount of time for tracking device 104 to establish a connection with a stationary access point at station 304 to obtain location updates and subsequently transmit the same to server 112.

However, at each station, when new passengers board train 310, tracking or mobile devices associated with such newly arrived passengers such as devices 320 have updated location information because they have just entered station 304 and immediately prior to doing so, received location updates from any one or more nearby cell tower such as a corresponding one of cell towers 312 that provide cellular coverage for geographical area covering station 304 and/or any nearby stationary access point such as corresponding one of access points 314, 316 and 318.

Due to accurate location updates available on associated tracking/mobile devices of newly arrived passengers, it is possible for tracking device 104 (that does not have access to any nearby cell tower or stationary access point to obtain location updates) to obtain its location update in a peer to peer manner from such newly arrived tracking/mobile devices by establishing a direction communication session with any one of them using any known or to be developed method of direct communication.

Thereafter, upon arrival at any given station (even if such station is not one at which user 102 intends to exit the underground transportation system), tracking device 104 may establish a connection to server 112 to report its location update (obtained via a peer to peer communication with newly arrived tracking/mobile devices), which can then be used by server 112 to determine timing of sending an arrival alert to merchant 108. A method of obtaining peer to peer location updates will be described below with reference to FIG. 4.

Figure 4:
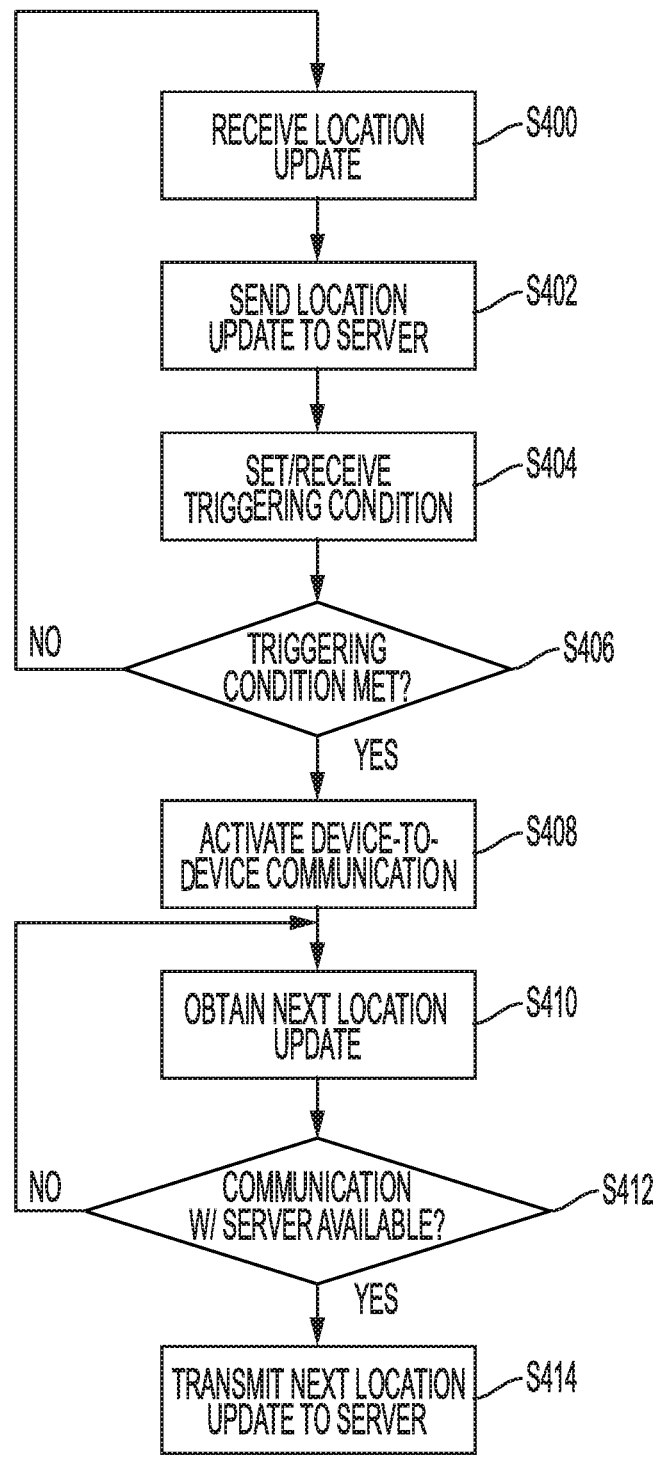
FIG. 4 is an example method of obtaining peer to peer location updates in accordance with one aspect of the present disclosure.

FIG. 4 is an example method of obtaining peer to peer location updates in accordance with one aspect of the present disclosure. FIG. 4 will be described with reference to FIG. 103 and from the perspective of tracking device 104. However, it will be understood that tracking device 104 may have one or more memories with computer-readable instructions stored thereon and one or more processors, which can execute the computer-readable instructions stored on the one or more memories to implement the functionalities described with respect to FIG. 4.

At S400 and immediately prior to entering station 302, tracking device 104 may receive a location update (first location update) from a nearby cell tower such as cell tower 312 or any other nearby stationary access point. S400 can also be performed immediately after tracking device enters station 302 and prior to boarding train 310 (e.g., while user 102 is waiting for train 310 to arrive) where tracking device 104 can obtain the first location update from access point 314.

At S402, tracking device 104 sends the first location update to server 112. In response to sending the first location update to server 112, at S404, tracking device 104 receives a set of one or more triggering conditions for sending a next location update to server 112. Examples of such triggering conditions include, but are not limited to, a threshold traveled distance or threshold amount of time after sending of the first location update at which tracking device 104 is to send the next location update to server 112. For example, server 112 can direct tracking device 104 to send its next location update to server 112 after tracking device 104 has traveled half a mile or 5 minutes has passed since tracking device 104 last sent the first location update. The triggering conditions may be set dynamically by server 112 depending on many factors including but not limited to, a destination specific profile (examples of which will be described below with reference to FIG. 5), time and distance of tracking device 104 to destination 106, etc.

In another example, a triggering condition may not be received from server 112 but instead may be a period of time (e.g., set internally in tracking device 104) for receiving a next location update from nearby cell towers or a nearby stationary access point. For example, after receiving first location update at S400, tracking device 104 may set an internal timer (e.g., with a duration that can be dynamically set based on experiments and/or empirical studies) for receiving the next location update from a nearby cell tower or stationary access point. An example of such timer can have duration of 30 seconds, one minute, five minutes, ten minutes, etc. In this example, at S404, a triggering condition is set by tracking device 104 instead of being received from server 112, as described above.

At S406, tracking device 104 determines if the triggering condition is met. In other words, tracking device 104 determines whether it can establish a connection to a nearby cell tower or stationary access point to obtain its next location update prior to expiration of the example internal timer above or prior to traveling a threshold distance or passage of a threshold amount of time after sending the first location update to server 112, where the threshold distance or time constitute the triggering conditions received from server 112 at S404.

If at S406, tracking device 104 determines that the triggering condition is not met (meaning tracking device 104 has received its next location update before the internal timer expired or alternatively, before/or at the threshold distance or time set by the triggering condition(s) received from server 112), then the process reverts back to S402, where tracking device 104 sends the next location update to server 112 followed by receiving next set of triggering condition(s) from server 112 at S404. Thereafter, S406 is repeated.

However, if at S406, tracking device 104 determines that the triggering condition is met (meaning tracking device 104 has not received its next location update before the internal timer expired or alternatively, before/or at the threshold distance or time set by the triggering condition(s) received from server 112), then at S408, tracking device 104 activates it's onboard device-to-device communication component(s) to establish a peer to peer communication session with other tracking or mobile devices in its vicinity (e.g., within a threshold distance of tracking device 104 such as within 100 feet, 200 feet, 500 feet, half a mile, etc.). Such peer to peer communication may be Bluetooth communication session, iBeacon communication session or any other known or to be developed low energy (LE) proximity sensing technology or communication scheme.

For security purposes, such peer to peer communication may be limited or encrypted such that only geographical coordinates of nearby devices (which have accurate location information due to a recent location update received from nearby cell towers or stationary access points prior to boarding train 310) are exchanged between tracking device 104 and any one of such nearby devices. For example, sharing information that identify or include private information of users associated with such nearby devices may not be shared and similarly identification of user 102 associated with tracking device 104 may not be exchanged or shared with such nearby devices in a peer to peer communication session.

Furthermore, in one example, when searching for location updates through peer to peer communication, tracking device 104 (as part of its initial broadcast message or as part of an initial handshake process with a nearby tracking device 32 to establish a device to device communication) may specify parameters of location updates available to such nearby device 320. For example, tracking device 104 may specify that it is only interested in receiving location updates over last 30 seconds, minute, 2 minutes, 5 minutes, 10 minutes, etc. If such condition is not met by a nearby device 320, then a device-to-device communication is not established by tracking device 104 with such nearby device 320.

At S410, tracking device 104, via the device-to-device communication, obtains a next location update (second location update) from one or more nearby devices 320. In one example, tracking device 104 starts broadcasting a signal (e.g., via Bluetooth) to nearby devices 320 asking for location updates. In response, any one of nearby devices 320 receives the broadcasted signal and assuming that such nearby device has location updates available, establishes a short range communication session with tracking device 104 (e.g., via any known or to be developed wireless communication method such as Bluetooth) and provides the location update it has to tracking device 104.

At S412, tracking device 104 determines if a connection to server 112 can be established. For example, tracking device 104 may obtain its second location from a nearby device 320 while train 310 is moving between stations 302 and 304. Tracking device 104 is constantly attempting to establish a connection to server 112. When at station 304, tracking device 104 is able to establish a connection to server 112 via access point 316, for example.

If a connection to server 112 can be established at S412, then at S414, tracking device 104 sends/transmits the next (second) location update to server 112. Otherwise, the process reverts back to S410 and server 112 repeats S410 and S412, whereby tracking device 104 continues to receive location updates from nearby tracking device(s) 320 until a communication session can be established with server 112 for tracking device 104 to send its updated location information thereto.

In addition to receiving improved location updates from tracking device 104, per method of FIG. 4, server 112 implements various techniques to further improve the accuracy of the arrival alert provided to destination 106. For example, server 112 applies machine learning to various statistical data to create destination specific model(s) for destination 106. Various statistic data can include, but is not limited to, past completed trips of users to destination 106, past completed trips of user 102, traffic conditions, modes of transportation, types of moving objects associated with user 102 (and/or driver 206 in FIG. 2), weather conditions, times of days, events taking place en route to destination 106 or at destination 106, speed of the moving object, any construction, road closures and improvement, etc. The statistical data can be stored in database 118.

For example, a particular brick-and-mortar store maybe located in a downtown area where traffic conditions vary greatly depending on time of day. Server 112 takes this information into consideration to build a destination specific model for the brick-and-mortar store located in the downtown area. During prediction of arrival of user 102 at the downtown location of the brick-and-mortar store and depending on the time of day, server 112 can augment its prediction and improve its arrival prediction using the corresponding destination specific model.

Figure 5:
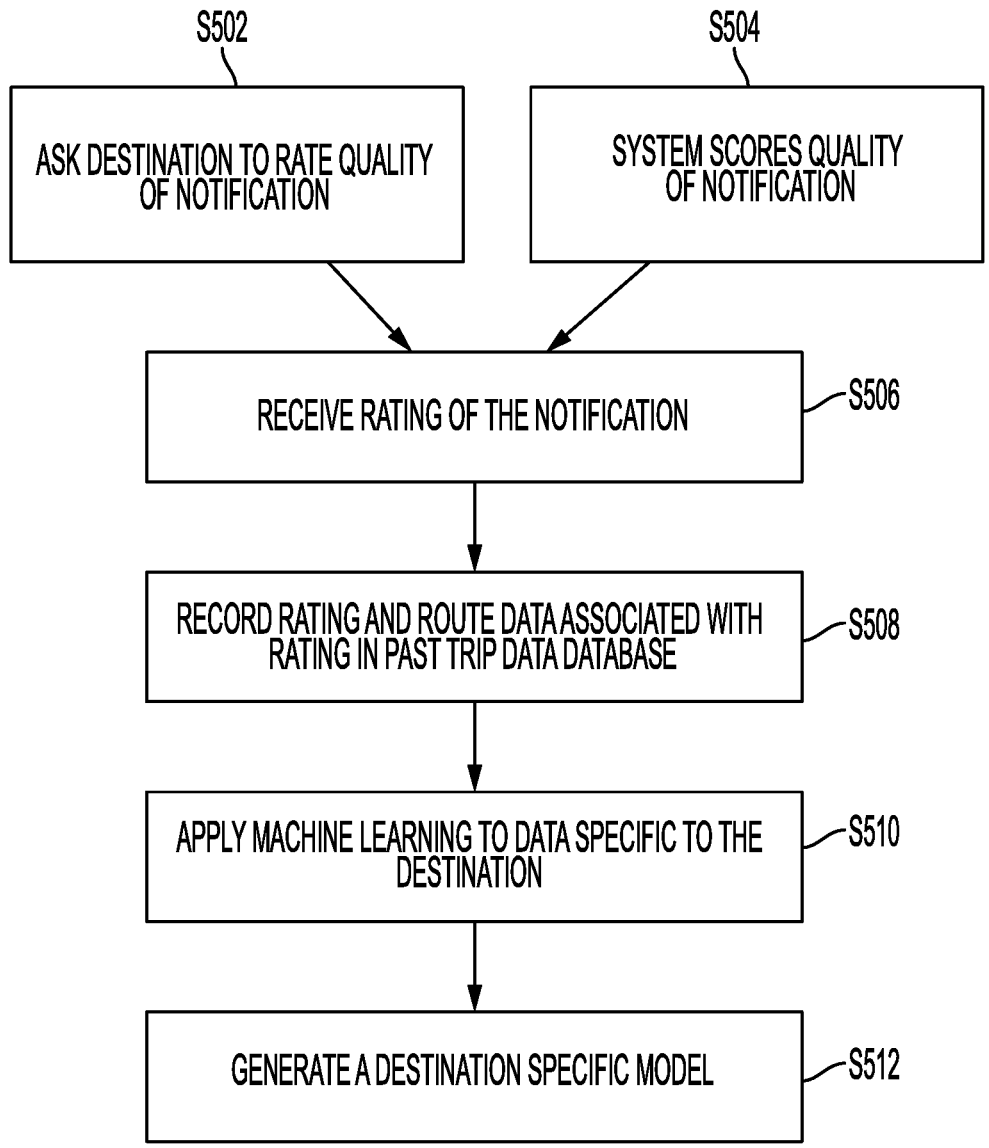
FIG. 5 shows an example method for creating a destination specific model in accordance with an aspect of the present disclosure.

FIG. 5 illustrates an example method for creating destination specific models in accordance with one aspect of the present disclosure. FIG. 5 will be described with reference to FIG. 1. However, the concepts described are equally applicable to the system of FIG. 2 as well. The method illustrated in FIG. 3 begins after one or more notifications have been provided to destination computing device 110 regarding an arrival prediction of user 102 at destination 106 to pick up order(s) (or one or more trips to destination 106 have been completed). Server 112 can store a collection of data in database 118. The data can be any one or more of statistical data examples provided above. In addition, server 112 can store information regarding the quality of past notifications and an identifier of the past notifications. For example, every time server 112 has provided an arrival alert to destination 106 indicating that user 102 will arrive in 8 minutes, server 112 compares this estimated arrival time to an actual time it took user 102 to arrive at destination 106. For example, while server 112 predicted, at time T0, that user 102 will arrive at destination 106 in 8 minutes, in reality, it may take user 102 6 minutes from T0 to arrive at destination 106. This indicates a prediction error of 25%. Server 112 stores this prediction error in database 118. During the next round of prediction and in providing the arrival alert, server 112 adjusts its prediction by 25% before providing the arrival alert (e.g., in the particular example described above, instead of providing the arrival alert at T0, server 112 now provides the arrival alert at T1 which is 2 minutes earlier than T0).

At S502, server 112 queries computing device 110 of destination 106 for rating a quality of a recently provided arrival alert. Operator 108 operating destination computing device 110 can respond to the query. Upon receiving the response, server 112 stores the rating at S506. In addition to, simultaneous with or instead of querying computing device 110 for rating, at S504, server 112 can calculate a rating or prediction error regarding the arrival alert, as described above. Similarly, the calculated rating is received at S506.

At S508, server 112 can record the received rating(s), per S502 and S504, in database 118 in association with an identification (ID) of the notification. The ID can be an identification of a particular transaction between user 102 and a merchant at destination 106, can be an identification associated with user 102, can be an identification associated with destination 106 or any combination thereof.

Server 112 can also store in database 118, information regarding a route taken (such as underground transportation system of FIG. 3) by user 102 in connection with a recently completed trip to destination 106, and any other data pertinent to the trip that resulted in the notification. The route taken by user 102 can be learned from data reported by location service 105 to server 112 while user 102 and associated computing device 104 were traveling to destination 106. In some examples, from this route information, server 112 can determine if user 102 made any stops while in route to destination 106. Server 112 can also record a time of day, day of week, and date associated with the notification in database 118. Server 112 can aggregate the above data for trips by many users.

At S510, server 112 applies machine learning algorithm(s) to the historical data specific to destination 106 stored in database 118. At S512, server 112 generates destination specific model for destination 106 based on the machine learning algorithm(s) applied to stored data at S510. In one example, destination specific model may be created or trained by analyzing factors associated with notifications that were considered of good quality and factors associated with notifications that were considered of poor quality. Since the destination specific model is generated through machine learning, some dimensions of destination specific model may not have any semantic meaning while some dimensions may have a semantic significance. For example, those dimensions having a semantic meaning can include likelihood that a user will make other stops along the route, likelihood that a user will encounter traffic along the route, the most likely routes to the destination, etc.

In some examples, machine learning may initially be trained on all data in database 118 regardless of destination to result in a location non-specific model. In such examples, destination specific model may be the result of tuning the location non-specific model for factors relevant to the destination 106.

As can be seen from the above description, server 112 performs a series of detailed calculations to determine/estimate, as accurately as possible, a time of arrival of user 102 and associated tracking device 104 at destination 106. Every time a location update is received from tracking device 104, server 112 performs such process, which includes at least establishing of a communication session with an external database to retrieve factors influencing the time of arrival at destination 106 such as weather and traffic conditions as well as performing detailed operations and running algorithms to predict the arrival time.

As an example, assuming that tracking device 104 is an hour away from destination 106 and is currently configured to send location updates every minutes, this translates into server 112 having to carry out the above described computationally intensive process, roughly 60 times.

While implementing the location determination process at fixed intervals (e.g., every minute) is possible, there is also a possibility of adjusting (dynamically) the intervals for implementing the location determination process that is less computationally intensive. This may be referred to as a smart location determination process.

Given that accuracy of determining location of tracking device 104 is important as the tracking device nears a time at which an arrival alert is to be sent to destination 106, such computationally extensive process need not be carried out one hour or 30 minutes away from destination 106. For example, if the arrival alert is to be transmitted to computing device 110 at destination 106, 8 minutes from user 102's arrival, the determination of the exact location of tracking device 104 is critical after tracking device 104 passes the 11 minute mark (is 11 minutes away from destination 106) but is less critical when tracking device 104 is 20 minutes away or after the arrival alert is sent (e.g., 3 minutes away).

A concept used in tracking applications is called isochrones. Isochrones are typically contours created around a particular location (e.g., destination 106). Each isochrone has an approximate time associated therewith, which is indicative of the remaining time to destination 106. Naturally, as one approaches destination 106, isochrones become smaller is size and are indicative of less remaining times to destination 106 while isochrones become larger and are indicative of longer remaining times as one moves further away from the destination.

Figure 6:
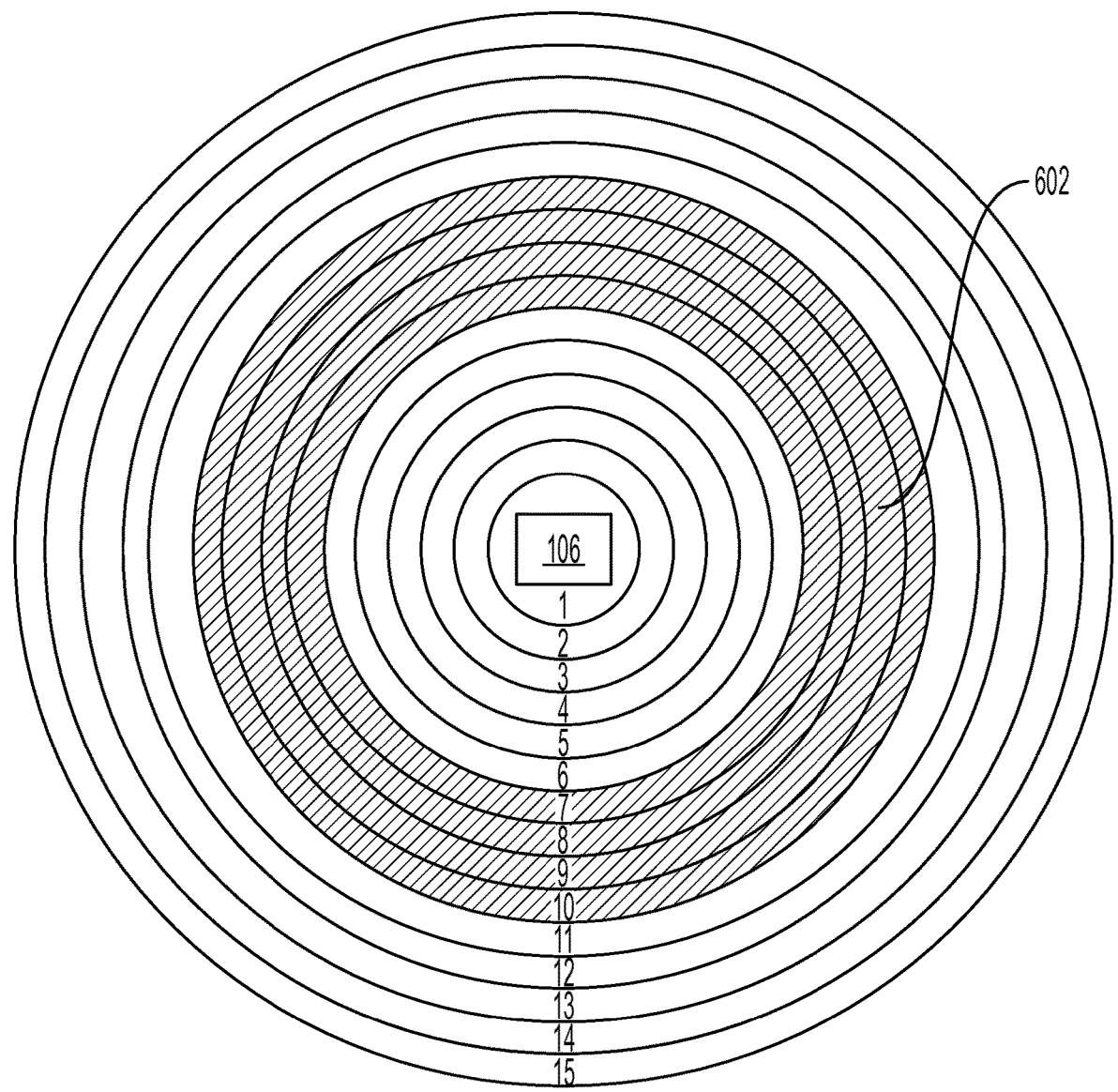
FIG. 6 shows an example of isochrones used in estimating the timing of the arrival of a tracking device at a destination in accordance with an aspect of the present disclosure.

FIG. 6 shows an example of isochrones used in estimating the timing of the arrival of a tracking device at a destination in accordance with an aspect of the present disclosure. Example of FIG. 6 illustrates 15 isochrones around destination 106. For ease of explanation and illustration, each isochrones is numbered such that it corresponds to the estimated remaining time to destination 106. For example, when tracking device is at or within isochrones 12, then approximately 12 minutes is left until user 102 arrives at destination 106.

The concept of isochrones is utilized in the present disclosure such that few isochrones that are closer to the time at which the arrival notification is to be provided to destination 106, are selected to form a "donut" or a "zone" around destination 106.

As an example, an assumption is made that operator 108 is to be notified of user 102's arrival at exactly 8 minutes (which is an example of an arrival threshold) therefrom. In this example, the donut can be defined from isochrone 6 to isochrone 10. This donut/zone is shown as shaded area 602 in FIG. 6. Accordingly, the sub-group of isochrones 6-10 form a time window (10 minutes to 6 minutes from destination 106) around the arrival threshold of 8 minutes mark, in this example.

Hereinafter, examples will be described according to which server 112 implements detailed and computationally intensive processes for determining an exact location of tracking device 104 from when tracking device 104 passes (enters) perimeters of isochrone 10 until it passes (exits) perimeters of isochrone 6 as it approaches destination 106. This computationally intensive process can be defined as one in which server 112 retrieves all relevant factors whether stored internally at database 118 (e.g., data corresponding to past trips) or retrieved from external sources such as public or private weather and traffic databases, etc.

However, outside the defined donut and upon receiving a location update from tracking device 104, server 112 performs minimal calculations to determine a rough estimate of the tracking device's location and remaining time to destination 106. Performing minimal calculations to obtain a rough estimate of location of tracking device 104 can be interpreted to be based on a current location of tracking device 104 and distance thereof to destination 106 without taking into consideration other factors that influence the remaining time to destination 106 including, but not limited to, historical data stored at server 112, traffic conditions, weather conditions, time of day, etc.

This process is hereinafter referred to as smart location determination where server 112 intelligently and selectively applies the computationally extensive process to determine the exact location of tracking device 104 and hence the remaining time to destination 106, depending on whether tracking device 104 is within a defined donut or not.

Figure 7:
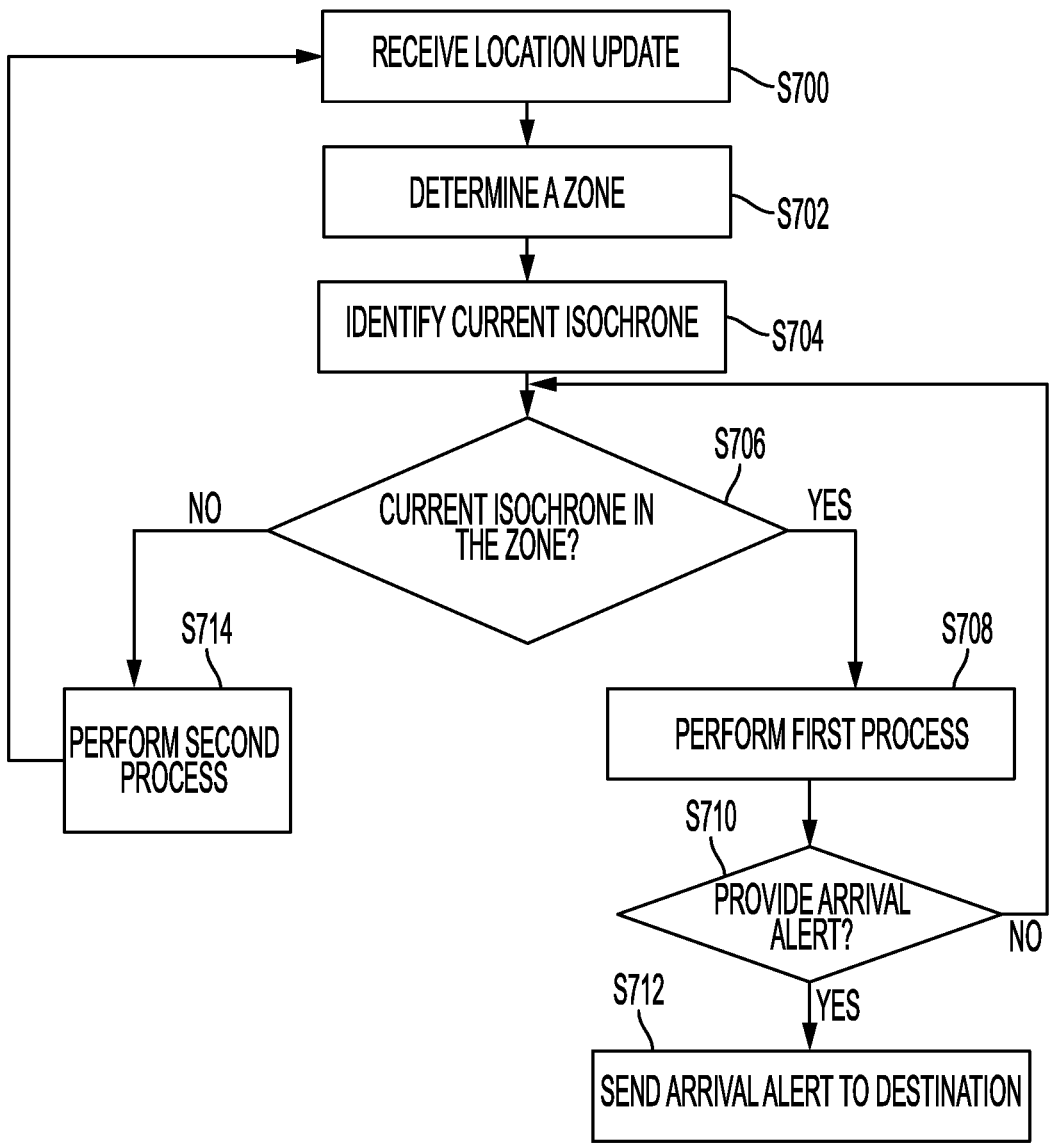
FIG. 7 shows an example method of providing arrival alerts in accordance with an aspect of the present disclosure.

FIG. 7 illustrates an example method of implementing smart location determination in accordance to an aspect of the present disclosure. Method of FIG. 7 is described from the perspective of server 112 and with reference to FIG. 1. However, the method of FIG. 7 is equally applicable to the system of FIG. 2. Furthermore, it is clear to those having ordinary skill in the art that one or more processors such as processor 114 of server 112 executes computer readable instructions stored on or more memories such as memory 116 to implement the functions described below.

At S700, server 112 receives a location update from tracking device 104. The location update can be provided in the form of a global positioning system (GPS) signal transmitted by tracking device 104 to a nearby cell tower and thereafter to server 112 (e.g., through the cellular networks backend gateway to the network) or in the alternative to a nearby connected access point when tracking device 104 is communicating over a WiFi connection.

In one example, tracking device 104 determines the location update to be sent to server 112 using a peer to peer location update scheme, as described above with reference to FIG. 4.

At S702, server 112 automatically determines or in the alternative receives specifications of a zone (donut) around destination 106. Server 112 can automatically determine/define the zone based on location specific model associated with destination 106, various historical and live data corresponding to geographical situation, traffic and weather conditions around destination 106, etc.

A zone such as zone 602, as described above, may be defined as a sub-group of isochrones around an isochrone corresponding to the arrival threshold at which an arrival alert is to be provided to destination 106 of upcoming arrival of user 102 associated with tracking device 014. This sub-group of isochrones may define a time window around the arrival threshold (e.g., +/−2 minutes from the example of 8 minute mark described above). A size of the time window may be a configurable parameter that may be defined based on experiments and/or empirical studies.

After receiving the location update at S700 and the specification of the zone, at S704, server 112 identifies a current isochrone in which tracking device 104 is located at the time of receiving the location update. The isochrone is identified based on a comparison of the location updates of tracking device 104 received at S500 to a map/database of determined isochrones around destination 106 (it is assumed that sever 112 has the isochrones map of destination 106 available).

Thereafter, at S706, server 112 determines if the identified current isochrone at S704 falls within the zone defined at S702.

If the identified isochrone falls within the zone, then at S708, server 112 performs a detailed (and computationally extensive) process (first process) for determining the location of tracking device 104 and remaining time to destination 106, as accurately as possible, where such process takes into consideration not only the updated location of tracking device 104 received at S700 but also various other factors retrieved form one or more external sources such as current traffic conditions on a route/path on which the user (and corresponding tracking device 104) is traveling to the destination, current weather conditions (on or within a geographical proximity of the route), specific conditions associated with the current route path taken by tracking device 104 to reach destination 106, as well as destination specific model developed by server 112 and stored thereon based on past trip data stored in database 118, etc. In one example such exact and detailed calculation of location of tracking device 104 allows server 112 to provide a more accurate arrival alert to destination 106.

Thereafter, at S710, server 112 determines whether to provide an arrival alert to destination 106 or not. This determination is based on whether the determined location of tracking device and the associated remaining time coincides with the arrival threshold at which an arrival alert is to be provided to destination 106. In the example above, this determination translates into determining if the current location of tracking device 104 indicates that tracking device 104 and user 102 are at the 8 minute mark (example arrival threshold) from destination 106 such that server 112 should inform destination 106 by providing the arrival alert.

If at S710, server 112 determines that the arrival alert is to be provided, then at S712, server 112 sends the arrival alert to destination 106 (e.g., to computing device 110 associated with destination 106) using any known or to be developed communication scheme.

However, if at S710, server 112 determines that the arrival alert is not to be provided, then the process reverts back to S706 and S706, S708, S710, S712 and S714 are repeated, as appropriate and applicable.

Referring back to S706, if the identified isochrone falls outside the zone defined at S702, at S714, server 112 only determines a rough estimate (second process) of tracking device's location using, for example, only the currently location of tracking device 104 (e.g., determined based on the peer to peer location update method of FIG. 4 by tracking device 104 and sent to server 112) and distance thereof to destination 106. Thereafter, the process may revert back to S700.

Figure 8:
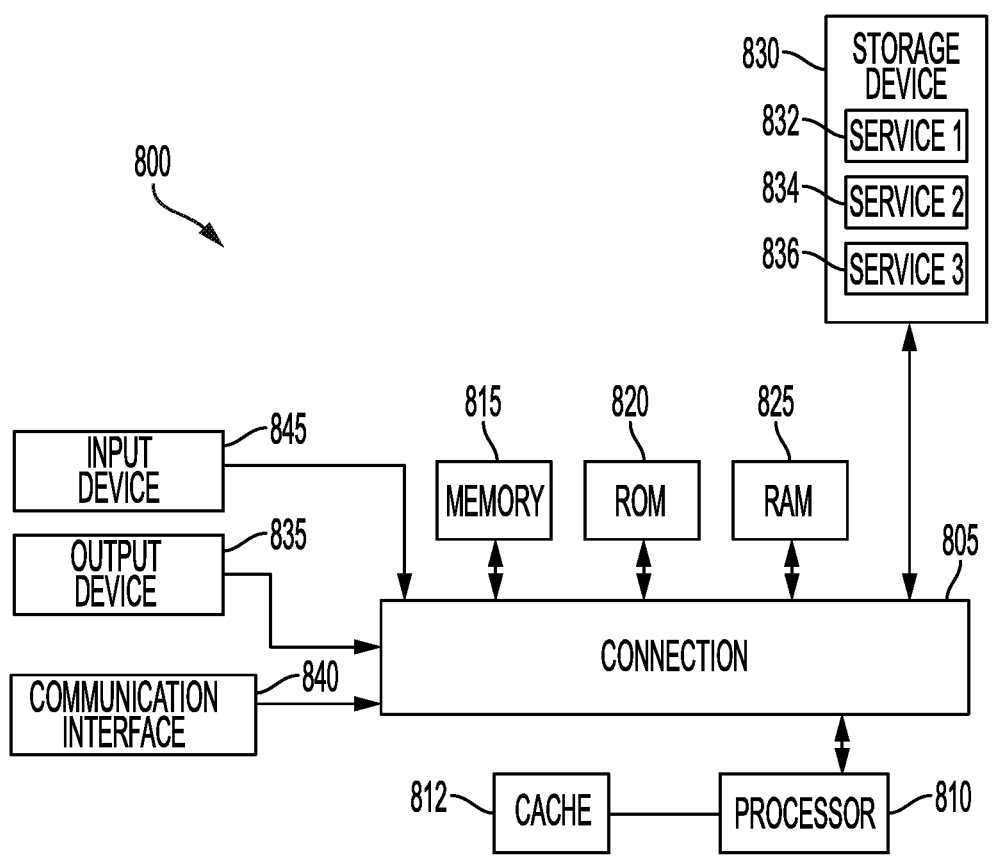
FIG. 8 shows an example of a system for implementing the present technology in accordance one aspect of the present disclosure.

FIG. 8 shows an example of a system for implementing the present technology in accordance one aspect of the present disclosure. Example system of FIG. 8 can be used to implement any one of network components described above with reference to FIGS. 1-6 including, but not limited to, tracking device 104, any nearby cell tower 312, any access point 314, 316 or 318, server 112, etc.

FIG. 8 illustrates computing system 800 in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some examples, computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) and random access memory (RAM) to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A device comprising:
   memory having computer-readable instructions stored therein; and
   one or more processors configured to execute the computer-readable instructions to:
      receive a first location update from a first base station configured to provide network connectivity to the device at or near a first location;
      determine that the device has not received a second location update from the first base station or a second base station after entering the first location, the first location being a closed area in which a connection between the device and the first base station or between the device and the second base station cannot be established;
      activate device-to-device communication for receiving location updates from nearby devices in vicinity of the device in response to determining that the device has not received the second location update from the first base station or the second base station;
      receive the second location update from at least one of the nearby devices via the device-to-device communication; and
      transmit the second location update to a server for communication of arrival indications to a merchant device.

2. The device of claim 1, wherein each of the first base station and the second base station is a cell tower or a stationary wireless access point.

3. The device of claim 1, wherein the one or more processors are configured to execute the computer-readable instructions to determine that the second location update is not received if a triggering condition is met.

4. The device of claim 3, wherein the triggering condition is one of a period of time after the first location update is received, an expiration of a time for receiving the second location update or a threshold distance traveled by the device before the second location update is received.

5. The device of claim 1, wherein the device-to-device communication is one of a short range wireless communication scheme or a beacon based transmission.

6. The device of claim 1 wherein the at least one of the nearby devices is a mobile device that has entered the closed area within a threshold period of time prior to establishing the device-to-device communication with the device.

7. The device of claim 2 wherein the closed area is an underground transit station or associated connecting tunnels.

8. The device of claim 1, wherein the server is configured to update, based on the second location update, the merchant device with an arrival indication that is indicative of a time of arrival of the device at a location of a corresponding merchant to pick up an order.

9. A method comprising:
receiving, at a device, a first location update from a first base station configured to provide network connectivity to the device at or near a first location;
determining, by the device, that the device has not received a second location update from the first base station or a second base station after entering the first location, the first location being a closed area in which a connection between the device and the first base station or between the device and the second base station cannot be established;
activating, by the device, device-to-device communication for receiving the second location update from nearby devices in vicinity of the device in response to determining that the device has not received the second location update from the first base station or the second base station;
receiving the second location update from at least one of the nearby devices via the device- to-device communication; and
sending the second location update to a server for the server to determine an arrival alert for alerting a destination of an amount of time remaining until the device reaches the destination.

10. The method of claim 9, further comprising:
sending the first location update to the server; and
receiving a triggering condition from the server in response to sending the first location update.

11. The method of claim 10, wherein determining that the second location update is not received is based on whether a triggering condition is met or not.

12. The method of claim 11, wherein the triggering condition is one of a period of time after the first location update is received, an expiration of a scheduled time for receiving the second location update from the first base station or the second base station or a threshold distance traveled by the device before the second location update is received.

13. The method of claim 9, wherein the device-to-device communication is one of a short range wireless communication scheme or a beacon based transmission.

14. The method of claim 9, wherein the at least one of the nearby devices is a mobile device that has entered the closed area within a threshold period of time prior to establishing the device-to-device communication with the device.

15. The method of claim 9, wherein the closed area is an underground transit station or associated connecting tunnel.

16. One or more non-transitory computer-readable medium having computer readable instructions stored thereon, which when executed by one or more processors of a tracking device, cause the one or more processors to:
receive a first location update from a first base station configured to provide network connectivity to the tracking device at or near a first location;
determine that the tracking device has not received a second location update from the first base station or a second base station after entering the first location, the first location being a closed area in which a connection between the tracking device and the first base station or between the tracking device and the second base station cannot be established;
activate on-board device-to-device communication components for receiving the second location update from nearby devices in vicinity of the tracking device in response to determining that the tracking device has not received the second location update from the first base station or the second base station;
receive the second location update from at least one of the nearby devices via the device- to-device communication components; and
send the second location update to a server for the server to determine an arrival alert for alerting a destination of an amount of time remaining until the tracking device reaches the destination.

17. The one or more non-transitory computer-readable medium of claim 16, wherein the execution of the computer readable instructions further cause the one or more processors to:
send the first location update to the server; and
receive a triggering condition from the server in response to sending the first location update.

18. The one or more non-transitory computer-readable medium of claim 17, wherein the execution of the computer-readable instructions causes the one or more processors to determine that the second location update is not received when the triggering condition is not met, the triggering condition being one of a period of time after the first location update is received, a threshold distance or a threshold time period before expiration of which the tracking device is to send the second location update to the server.

* * * * *